United States Patent
Mitsutani et al.

(10) Patent No.: US 8,922,170 B2
(45) Date of Patent: Dec. 30, 2014

(54) ELECTRIC POWER SUPPLY SYSTEM AND VEHICLE HAVING THE SAME MOUNTED THEREIN, AND METHOD OF CONTROLLING ELECTRIC POWER STORAGE DEVICE

(75) Inventors: Noritake Mitsutani, Toyota (JP); Takehiro Koga, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 27 days.

(21) Appl. No.: 13/994,329

(22) PCT Filed: Dec. 24, 2010

(86) PCT No.: PCT/JP2010/073331
§ 371 (c)(1),
(2), (4) Date: Jun. 14, 2013

(87) PCT Pub. No.: WO2012/086057
PCT Pub. Date: Jun. 28, 2012

(65) Prior Publication Data
US 2013/0271086 A1    Oct. 17, 2013

(51) Int. Cl.
*H02J 7/00* (2006.01)
(52) U.S. Cl.
USPC .......................................................... 320/136
(58) Field of Classification Search
CPC ...... H02J 7/0029; H02J 7/0031; H02J 7/0068
USPC .................... 320/134–136; 361/79
See application file for complete search history.

(56) References Cited

U.S. PATENT DOCUMENTS

| 8,228,037 B2 * | 7/2012 | Furukawa et al. ............ 320/134 |
| 2010/0070133 A1 | 3/2010 | Ishishita |
| 2011/0148361 A1 * | 6/2011 | Yokotani ....................... 320/136 |
| 2014/0022681 A1 * | 1/2014 | Mitsutani ........................ 361/86 |

FOREIGN PATENT DOCUMENTS

| JP | 2008-182779 A | 8/2008 |
| JP | 2008-220088 A | 9/2008 |
| JP | 2008-234903 A | 10/2008 |
| JP | 2009-189152 A | 8/2009 |
| JP | 2009-227078 A | 10/2009 |
| JP | 2010-015831 A | 1/2010 |

* cited by examiner

*Primary Examiner* — Richard V Muralidar
(74) *Attorney, Agent, or Firm* — Kenyon & Kenyon LLP

(57) ABSTRACT

An electric power supply system for supplying a load device with driving electric power includes an electric power storage device and an ECU. The electric power storage device includes a CID configured to interrupt an electrical conduction path of the electric power storage device in response to the electric power storage device having an internal pressure exceeding a rated value. The controller calculates a voltage variation length corresponding to an integral of an amount by which a voltage applied to the load device varies in magnitude and a current variation length corresponding to an integral of an amount by which a current input/output to/from the electric power storage device varies in magnitude for each sampling period for a predetermined period of time. Then, the ECU determines whether or not the CID has been operated, based on the voltage variation length and the current variation length.

8 Claims, 6 Drawing Sheets

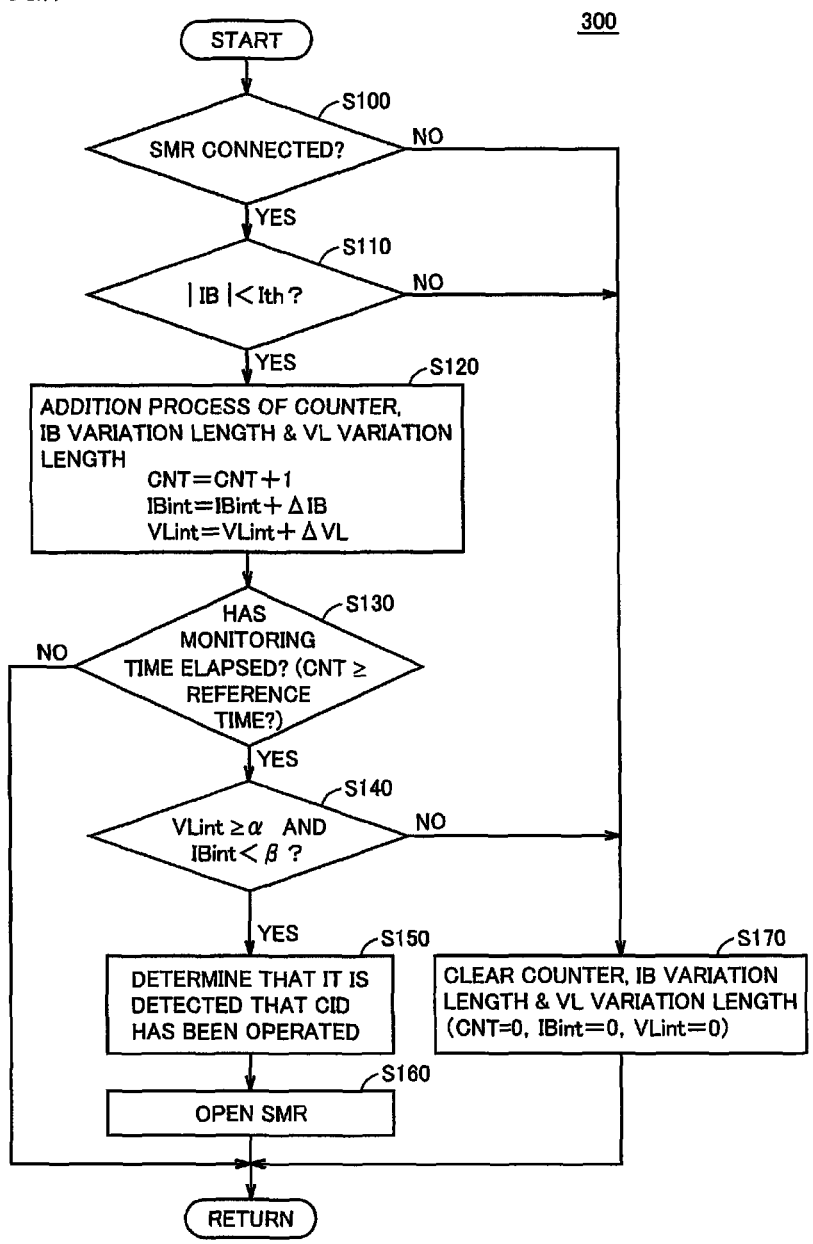

ELECTRIC POWER SUPPLY SYSTEM AND VEHICLE HAVING THE SAME MOUNTED THEREIN, AND METHOD OF CONTROLLING ELECTRIC POWER STORAGE DEVICE

CROSS REFERENCE TO RELATED APPLICATION

This is a national phase application based on the PCT International Patent Application No. PCT/JP2010/073331 filed on Dec. 24, 2010, the entire contents of which are incorporated herein by reference.

TECHNICAL FIELD

The present invention relates to an electric power supply system and a vehicle having the same mounted therein, and a method of controlling an electric power storage device, and more particularly to technology for detecting whether a current interrupt device (CID) included in the electric power storage device has been operated.

BACKGROUND ART

In recent years, as an environmentally friendly vehicle, a vehicle that has an electric power storage device (for example a secondary battery, a capacitor, or the like) mounted therein and travels using a driving force produced from electric power stored in the electric power storage device is attracting attention. This vehicle includes an electric vehicle, a hybrid vehicle, a fuel-cell vehicle, and the like for example.

Such an electric power storage device is generally configured of a plurality of battery cells stacked in series or in parallel to output desired voltage. When these battery cells have disconnection, short circuit or similar defects, the electric power storage device may not normally function. Accordingly, detecting whether the battery cells have defect is required.

Japanese Patent Laying-Open No. 2009-227078 (PTL 1) discloses that a motive power system which employs a boost converter to boost voltage received from a battery and supplies the boosted voltage to an inverter and employs a DC-DC converter to lower the voltage of the battery and supplies the lowered voltage to accessories, uses a voltage value received from a first voltage sensor that senses a voltage of the boost converter at a side where the battery is connected and a voltage value received from a second voltage sensor that senses a voltage of the DC-DC converter at a side where the battery is connected to determine whether the first voltage sensor has defect and whether the battery has overvoltage fault.

CITATION LIST

Patent Literature

PTL 1: Japanese Patent Laying-Open No. 2009-227078
PTL 2: Japanese Patent Laying-Open No. 2010-015831
PTL 3: Japanese Patent Laying-Open No. 2009-189152

SUMMARY OF INVENTION

Technical Problem

A type of electric power storage device has each battery cell equipped with a current interrupt device (CID). The CID generally has a configuration such that when the electric power storage device has a defective battery cell having an internal pressure exceeding a rated value, the internal pressure causes the CID to operate to interrupt an electrical conduction path of the electric power storage device in hardware. The CID operated thus prevents the electric power storage device from overvoltage.

However, whether the CID has been operated may not be directly detectable, and for example if a hybrid vehicle or the like continues to travel with the CID in operation, large voltage is applied to the CID and thus provides a cause of a spark or the like in a battery cell, and may induce a secondary failure. Accordingly, it is necessary to quickly detect that the CID has been operated.

Japanese Patent Laying-Open No. 2009-227078 (PTL 1) and the other above Patent Literature do not describe this CID nor indicate any technique to detect whether the CID has been operated.

The present invention has been made in order to address such an issue and it contemplates an electric power supply system equipped with an electric power storage device including a CID, which can detect with precision that the CID has been operated.

Solution To Problem

The present invention provides an electric power supply system that includes an electric power storage device electrically connected to a load device and a controller for controlling the electric power storage device and supplies the load device with driving electric power. The electric power storage device includes an interrupt device configured to interrupt an electrical conduction path of the electric power storage device in response to the electric power storage device having an internal pressure exceeding a rated value. The controller determines, based on a voltage applied to the load device and a current input to and output from the electric power storage device, whether or not the interrupt device has been operated.

Preferably, the controller calculates a voltage variation length corresponding to an integral of an amount by which the voltage varies in magnitude and a current variation length corresponding to an integral of an amount by which the current varies in magnitude for each sampling period for a predetermined period of time, and the controller determines, based on the voltage variation length and the current variation length, whether or not the interrupt device has been operated.

Preferably, the controller determines that the interrupt device has been operated when the current has an absolute value smaller than a predetermined reference value and the voltage variation length is larger than a first threshold value and the current variation length is smaller than a second threshold value.

Preferably, a switching device is provided on a route connecting the electric power storage device and the load device for switching electrical conduction and non conduction states between the electric power storage device and the load device, and when the controller determines that the interrupt device has been operated, the controller switches the switching device to the electrical non-conduction state.

Preferably, if the current has an absolute value larger than the reference value, the controller sets the voltage variation length and the current variation length to have initial values, respectively.

Preferably, a switching device is provided on a route connecting the electric power storage device and the load device for switching electrical conduction and non conduction states between the electric power storage device and the load device, and when the switching device is set to the electrical conduction state, the controller determines whether the interrupt device has been operated, and when the switching device is set to the electrical non-conduction state, the controller responsively sets the voltage variation length and the current variation length to have initial values, respectively.

Preferably, a capacitor connected in parallel with the electric power storage device is provided between input terminals of the load device.

The present invention provides a vehicle including: an electric power storage device; a load device including a drive device configured to use electric power received from the electric power storage device to generate force to drive the vehicle; and a controller for controlling the electric power storage device. The electric power storage device includes an interrupt device configured to interrupt an electrical conduction path of the electric power storage device in response to the electric power storage device having an internal pressure exceeding a rated value. The controller determines, based on a voltage applied to the load device and a current input to and output from the electric power storage device, whether or not the interrupt device has been operated.

The present invention provides a method for controlling an electric power storage device for supplying a load device with driving electric power, and the electric power storage device includes an interrupt device configured to interrupt an electrical conduction path of the electric power storage device in response to the electric power storage device having an internal pressure exceeding a rated value. The method includes the steps of: detecting a voltage applied to the load device; detecting a current input to and output from the electric power storage device; and determining, based on the voltage and the current, whether or not the interrupt device has been operated.

Advantageous Effects of Invention

The present invention can thus provide an electric power supply system equipped with an electric power storage device including a CID, which can detect with precision that the CID has been operated.

BRIEF DESCRIPTION OF DRAWINGS

FIG. 7 is a flowchart for specifically illustrating a CID operation detection control process performed by the ECU in the present embodiment.

DESCRIPTION OF EMBODIMENTS

Hereinafter, the present invention in embodiment will be described with reference to the drawings. In the figures, identical or corresponding components are identically denoted and will not be described repeatedly in detail.

Figure 1:
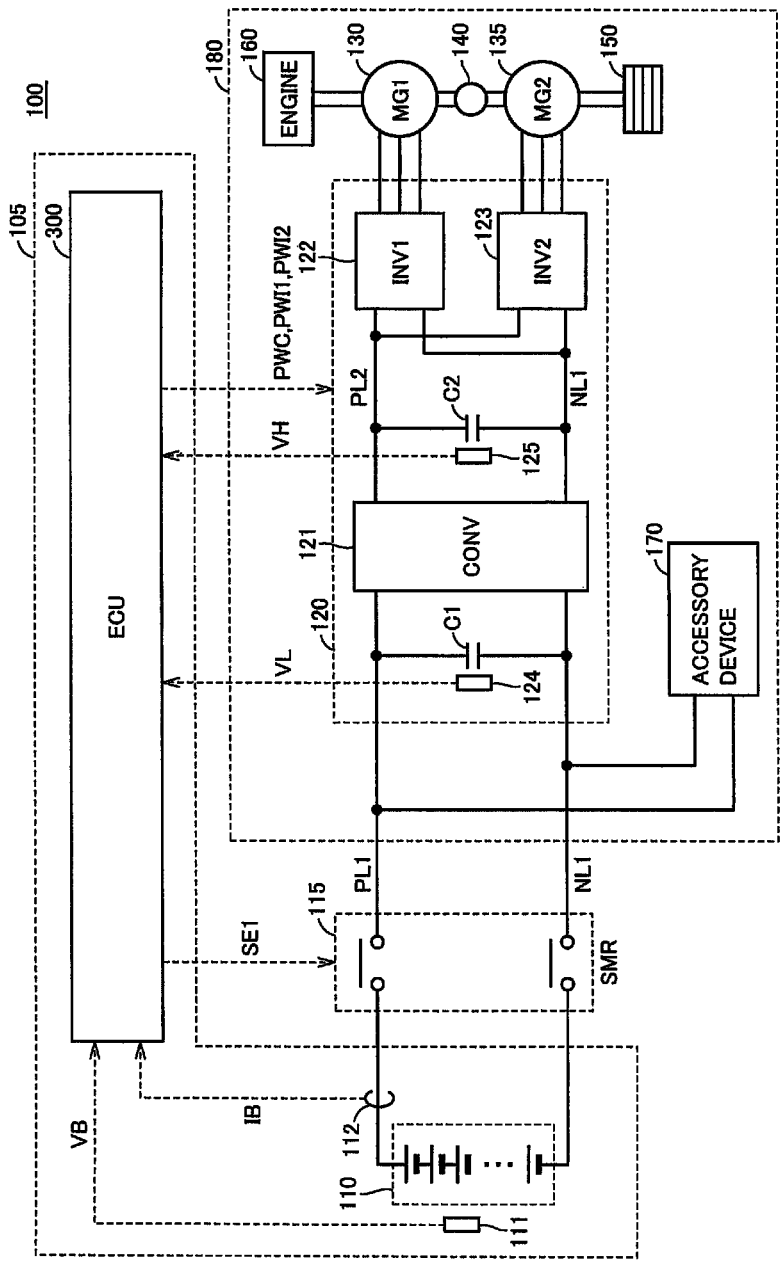
FIG. 1 is a general block diagram of a vehicle having an electric power supply system mounted therein according to an embodiment of the present invention.

With reference to FIG. 1, a vehicle 100 includes an electric power supply system 105, a system main relay (SMR) 115, and a load device 180.

Electric power supply system 105 includes an electric power storage device 110, a voltage sensor 111, a current sensor 112, and an electronic control unit (ECU) 300 serving as a controller.

Load device 180 includes a power control unit 120 (PCU) serving as a drive device, motor generators 130, 135, a motive power transfer gear 140, a driving wheel 150, an engine 160 serving as an internal combustion engine, and an accessory device 170. PCU 120 includes a converter 121, inverters 122, 123, voltage sensors 124, 125, and capacitors C1, C2.

Electric power storage device 110 is a chargeably and dischargeably configured, electric power storage element. Electric power storage device 110 is configured including for example a lithium ion battery, a nickel metal hydride battery, a lead acid battery or a similar secondary battery, or an electric double layer capacitor or a similar electric power storage element.

Electric power storage device 110 is connected to PCU 120 via an electric power line PL1 and a ground line NL1. Electric power storage device 110 supplies electric power to PCU 120 for generating force to drive vehicle 100. Furthermore, electric power storage device 110 stores therein electric power generated by motor generators 130 and 135. Electric power storage device 110 provides an output for example of approximately 200 V.

Voltage sensor 111 senses voltage VB of electric power storage device 110, and outputs the sensed result to ECU 300. Current sensor 112 senses current IB input/output to/from the electric power storage device, and outputs the sensed value to ECU 300.

SMR 115 includes relays inserted in electric power line PL1 and ground line NL1, respectively, connecting electric power storage device 110 and PCU 120. SMR 115 operates in response to a control signal SE1 received from ECU 300 to switch between supplying and interrupting electric power between electric power storage device 110 and PCU 120.

Converter 121 operates in response to a control signal PWC received from ECU 300 to convert voltage between electric power line PL1 and ground line NL1, and an electric power line PL2 and ground line NL1.

Inverters 122, 123 are connected to electric power line PL2 and ground line NL1 in parallel. Inverters 122, 123 operate in response to control signals PWI1 and PWI2, respectively, received from ECU 300 to convert the direct current electric power that is received from converter 121 to alternate current electric power and thus drive motor generators 130, 135, respectively.

Capacitor C1 is provided between electric power line PL1 and ground line NL1, and decreases voltage variation between electric power line PL1 and ground line NL1. Capacitor C2 is provided between electric power line PL2 and ground line NL1, and decreases voltage variation between electric power line PL2 and ground line NL1.

Voltage sensors 124 and 125 sense voltages VL and VH across capacitors C1 and C2, respectively, and output the sensed values to ECU 300.

Motor generator 130, 135 is an alternating current rotating electric machine, and is a permanent magnet type, synchronous motor for example equipped with a rotor having a permanent magnet buried therein.

Motor generators 130, 135 output torque, which is in turn transmitted to driving wheel 150 via motive power transmission gear 140 configured to include a speed reducer, a motive power split device and the like, and thus causes vehicle 100 to travel. Motor generators 130, 135 in operation to regeneratively brake vehicle 100 can generate electric power by the rotative force of driving wheel 150. The generated electric power is converted by PCU 120 to electric power to charge electric power storage device 110.

Furthermore, motor generators 130 and 135 are also coupled with engine 160 via motive power transmission gear 140. ECU 300 causes motor generators 130, 135 and engine 160 to operate cooperatively to generate force to drive the vehicle, as required. Furthermore, motor generator 130 and 135 can generate electric power by rotation of engine 160, and the generated electric power can be used to charge electric power storage device 110. Note that in the present embodiment, motor generator 135 shall be used exclusively as an electric motor for driving driving wheel 150, and motor generator 130 shall be used exclusively as an electric power generator driven by engine 160.

Note that while FIG. 1 shows two motor generators in an exemplary configuration, one or three or more motor generators may alternatively be provided. Furthermore, engine 160 is not an essential component, and the vehicle may be an electric vehicle, a fuel-cell vehicle or the like that does not include engine 160. Furthermore, the load connected to electric power storage device 110 is not limited to the above described vehicle, and the present embodiment is applicable to electronics driven on electric power output from electric power storage device 110.

Load device 180 includes an accessory device 170 as a configuration of a low voltage system (an accessory system). Accessory device 170 includes, for example, a DC/DC converter, an audio system, a navigation system and other similar accessory loads, an accessory battery, an air-conditioner (all not shown), and the like.

Although not shown in FIG. 1, ECU 300 includes a central processing unit (CPU), a storage device, and an input/output buffer, and ECU 300 receives a signal from each sensor, outputs a control signal to each device, and furthermore, controls each device of electric power storage device 110 and that of vehicle 100. Note that they are controlled not only in a process by software, but can also be processed by dedicated hardware (or electronic circuitry).

ECU 300 calculates a state-of-charge (SOC) of electric power storage device 110 from the sensed values of voltage VB and current IB received from voltage sensor 111 and current sensor 112 provided for electric power storage device 110.

Note that while electric power storage device 110 is configured of a plurality of battery cells connected in series to output desired voltage, as will be described hereinafter with reference to FIG. 2, voltage VB sensed by voltage sensor 111 is not voltage across electric power storage device 110; rather, generally, it is calculated based on a sum of the voltages of the individual battery cells. As such, even if a CID is operated, voltage VB output may not be zero.

ECU 300 generates and outputs a control signal for controlling PCU 120, SMR 115, and the like. Note that while FIG. 1 shows ECU 300 provided as a single controller, a controller may be provided individually for each function or each device to be controlled, such as a controller for PCU 120, a controller for electric power storage device 110 and the like.

Figure 2:
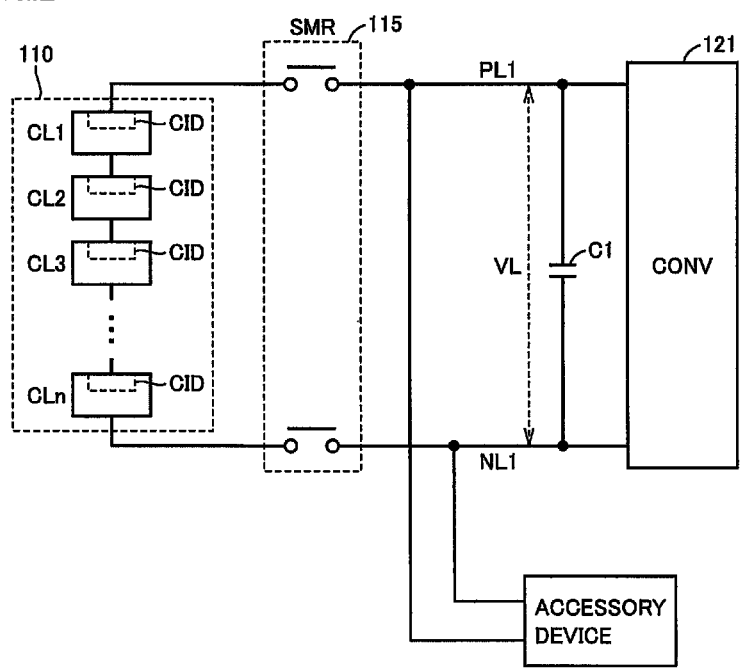
FIG. 2 specifically shows a configuration of an electric power storage device.

FIG. 2 specifically shows a configuration of electric power storage device 110. With reference to FIG. 2, electric power storage device 110 is configured including a plurality of battery cells CL1-CLn connected in series (hereinafter, also generally referred to as CL), and a desired output voltage is obtained depending on the number of battery cells CLs. Each battery cell CL is provided with a current interrupt device CID.

When the electrolyte of battery cell CL generates gas which in turn causes internal pressure in battery cell CL to exceed a rated value, the CID is operated by the internal pressure and physically interrupts the battery cell from the other battery cells. Accordingly, once any of battery cells CLs has its CID operated, electric power storage device 110 will no longer have a current passing therethrough.

It is known that when a CID is operated and a current is interrupted, a difference in voltage between a total voltage of the battery cells other than the battery cell having its CID operated and voltage VL input to load device 180 will be applied to the operated CID. Accordingly, when SMR 115 electrically conducts and in that condition for example PCU 120, accessory device 170 and the like consume electric power and accordingly, capacitor C1 has its electrical charge decreased and voltage VL is reduced, the voltage applied to the operated CID accordingly increases. The portion interrupted by the CID only has a small gap, and when the voltage applied to the CID exceeds a predetermined withstand voltage, a spark occurs in the gap or the like and a secondary failure may be induced. Accordingly, it is necessary to quickly detect that the CID has been operated. Generally, however, battery cell CL may not have a means for outputting that a CID has been operated.

Furthermore, it has been known from an experiment or the like that when a CID is operated, voltage VL varies. This is because while charging/discharging between electric power storage device 110 and load device 180 stops, PCU 120 consumes or generates electric power and accessory device 170 consumes electric power, which varies an amount of electric charge stored in capacitor C1.

For example when vehicle 100 is traveling and PCU 120 consumes large electric power, i.e., for a large load, and in that condition a CID is operated, voltage VL decreases more rapidly than when the CID is not operated. Accordingly, for large load, whether a CID has been operated can be detected by monitoring a degree by which voltage VL increases/decreases.

However, for example when load device 180 has a small total power consumption or when electric power generated by one motor generator and electric power consumed by the other motor generator are in balance, and in that condition a CID is operated, the electric power stored in capacitor C1 is not consumed, and voltage VL can vary in a small amount. In that case it is difficult to detect that the CID has been operated only by monitoring variation of voltage VL, and detecting that the CID has been operated may be delayed.

Furthermore, when vehicle 100 travels on an icy road or a road having sand, water and/or the like accumulated thereon, driving wheel 150 may slip and subsequently, suddenly grip. In such a case, torque cannot be controlled to follow rapid variation of load, and as a result, voltage VL varies. Accordingly, if only a degree by which voltage VL varies is monitored to determine whether a CID has been operated, and in that condition such a slip and grip as above occurs, then, while in reality the CID is not operated, such an erroneous detection that the CID has been operated may be made.

In view of such a disadvantage, in the present embodiment, voltage VL and, in addition thereto, current IB input to and output from the electric power storage device are considered in detecting whether a CID has been operated. More specifically, when a current is small in magnitude, i.e., in a state with a small current, how voltage VL and current IB vary in magnitude for each sampling period for a predetermined period of time is integrated to obtain a variation length, and therefrom, whether the CID has been operated is detected. This can reduce erroneous detection of the CID's operation, and whether the CID has been operated can be detected with precision.

Figure 3:
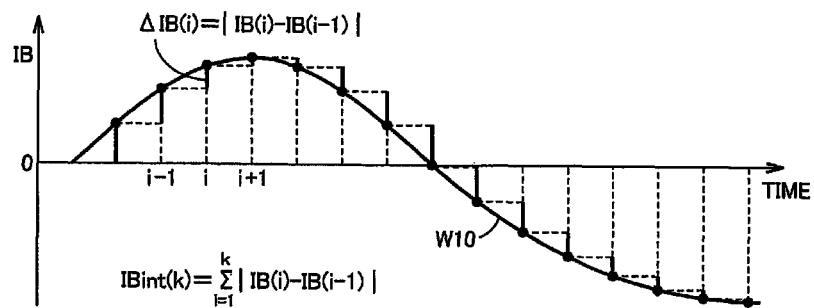
FIG. 3 outlines control exerted in detecting whether a CID has been operated in the present embodiment.

FIG. 3 is now used to initially describe a voltage variation length VLint and a current variation length IBint. Note that in FIG. 3, current variation length IBint will be used as an example for description.

With reference to FIG. 3, electric power storage device 110 receives/outputs current TB varying as indicated in FIG. 3 by a line W10 for the sake of illustration. ECU 300 periodically samples current IB input to/output from the electric power storage device. For each sampling, the current provides a value, which is indicated on line W10 at a point, and for example, after sampling the current has started, and when time t=i−1 arrives, the current provides a value IB(i−1), and when time t=i arrives, the current provides a value IB(i), for the sake of illustration.

Then, from time t=i−1 to time t=i, the current varies by an amount ΔIB(i) expressed by the following equation (1):

$$\Delta IB(i) = |IB(i) - IB(i-1)| \quad (1)$$

If the current is sampled k times for a predetermined period of time T0, then current variation length IBint (k) is expressed by an equation (2):

$$IBint(k) = \Sigma |IB(i) - IB(i-1)|$$

where $$(i=1, k) \quad (2)$$

That is, current variation length IBint can serve as an index indicating how vibratorily current IB has varied for the predetermined period of time T0. Accordingly, for example, if current IB has equal average values for periods of time T0, respectively, a period of time with the current vibratorily varying provides current variation length IBint having a larger value.

Figure 4:
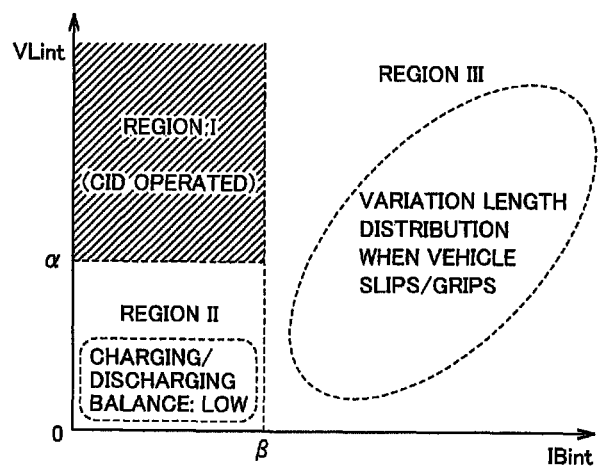
FIG. 4 illustrates a current variation length.

Hereinafter, a technique using voltage variation length VLint and current variation length IBint to determine whether a CTD has been operated will be described with reference to FIG. 4. In FIG. 4, the axis of abscissa represents current variation length IBint, and the axis of ordinate represents voltage variation length VLint.

With reference to FIG. 4, the FIG. 4 graph is generally sectioned into three regions (regions I, II, and III) by a threshold value α for voltage variation length VLint and a threshold value β for current variation length IBint.

Region I is a region in which voltage variation length VLint is larger than threshold value α (VLint>α) and current variation length IBint is smaller than threshold value β (IBint<β), and region I represents a state with a CID operated.

When electric power storage device 110 has a CTD operated, electric power storage device 110 no longer receives/outputs current IB. Accordingly, current IB does not vary, and current variation length IBint will indicate a small value. On the other hand, voltage VL significantly varies with variation in load, since when the electric power consumed by load device 180 and that generated thereby vary, a shortfall of electric power or excessive electric power cannot be input to and output from electric power storage device 110. Thus, voltage variation length VLint is increased.

Thus, region I with VLint>α and IBint<β is a region meaning that a CID has been operated.

Region II is a region in which voltage variation length VLint is smaller than threshold value α (VLint<α) and current variation length IBint is smaller than threshold value β (IBint<β). In this region, as well as region I, electric power storage device 110 may receive/output small current IB and accordingly, current IB may vary less. However, voltage VL is stably controlled in response to variation in load, and accordingly, it can be determined that there is only a limited possibility that a CID is in operation.

Region III is a region in which current variation length IBint is larger than threshold value β (IBint>β). This region indicates that current IB varies significantly, and accordingly, it can be determined that electric power storage device 110 is charged/discharged, that is, no CTD is operated. Note that if the vehicle 100 has driving wheel 150 repeatedly slipping/gripping, then, as will be described hereinafter with reference to FIG. 5, voltage variation length VLint and current variation length IBint both increase, which will correspond to region III.

Figure 5:
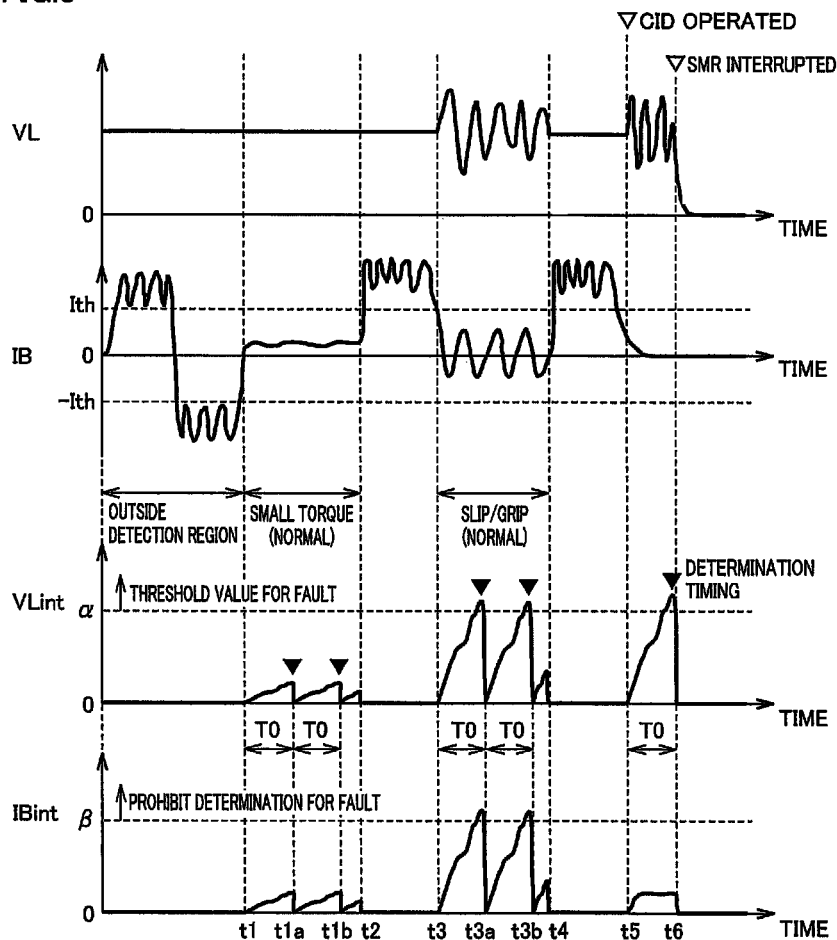
FIG. 5 illustrates a relationship between a voltage variation length and a current variation length, and a vehicle's state.

FIG. 5 illustrates control exerted in detecting whether a CID has been operated in the present embodiment. In FIG. 5, the axis of abscissa represents time and the axis of ordinate represents voltage VL, current IB, voltage variation length VLint, and current variation length IBint.

With reference to FIG. 5, before time t0, no CID is operated, i.e., a normal state is provided, and a torque, i.e., current TB, is relatively large in magnitude (|IB|>Ith). When current IB is thus large in magnitude, it can be determined that electric power storage device 110 is appropriately supplied with electric power or electrically charged and that there is only a limited possibility that a CID is operated, and accordingly, ECU 300 does not perform an operation for voltage variation length VLint or current variation length IBint.

For a period of time from times t1 to t2, no CID is operated and current IB input/output is small in magnitude, i.e., a state with a small torque state (|IB|<Ith) is provided. Based on that current IB is small in magnitude, ECU 300 performs an operation for voltage variation length VLint and current variation length IBint. For the period of time from times t1 to t2, however, voltage VL and current IB do not oscillatorily vary, and hence stabilize. Accordingly, voltage variation length VLint and current variation length IBint are both small.

Based on that current variation length IBint obtained whenever the predetermined period of time T0 elapses (or when times t1a, t1b arrive) is smaller than threshold value β for prohibiting determination for fault (IBint<β) ECU 300 checks voltage variation length VLint at times t1a and t1b. For this period of time, however, the CIDs are normal and voltage VL is stable, and accordingly, voltage variation length VLint has not reached threshold value α indicating that a CID has been operated. Accordingly, ECU 300 determines that no CTD is operated between times from t1 to t2.

For a period of time from times t2 to t3, as well as the period of time by time t1, current IB has an absolute value larger than reference current Ith, and accordingly, ECU 300 does not perform an operation for voltage variation length VLint or current variation length IBint.

For a period of time from times t3 to t4, vehicle 100 repeatedly slips and grips. In this state, current IB vibratorily varies in a state of a small current as the vehicle slips and grips. Furthermore, ECU 300 controls converter 121 and inverters 122, 123 in such a manner that cannot follow a torque variation caused as the vehicle slips and grips, and accordingly, voltage VL also varies vibratorily.

For this period of time, current IB has an absolute value smaller than the reference current (|IB|<Ith), and accordingly, ECU 300 performs an operation for voltage variation length VLint and current variation length IBint. Then, ECU 300 checks current variation length IBint, as timed for determination whenever the predetermined period of time T0 elapses (or at times t3a, t3b).

However, as the vehicle slips and grips and accordingly a torque varies, current variation length IBint increases, and when determination is made as timed, i.e., at times t3a, t3b, current variation length IBint is larger than threshold value β for prohibiting determination for fault. Accordingly, at times t3a and t3b, if voltage variation length VLint has reached the level of threshold value α indicating that a CID has been operated, it is not determined that the CID has been operated. For a period of time from times t4 to t5, current IB has an absolute value increased to be again larger than reference current Ith, and accordingly, ECU 300 does not perform an operation for voltage variation length VLint or current variation length IBint.

Then, at time t5, it is assumed that a CID has been operated. Then, electric power storage device 110 can no longer be charged/discharged, and current IB will not flow and reach zero. In response, ECU 300 starts an operation for voltage variation length VLint and current variation length IBint. As current IB does not flow, current variation length IBint is smaller than threshold value β.

As electric power storage device 110 is not charged/discharged, voltage VL vibratorilly varies as the electric power consumed by load device 180 and that generated thereby vary. Then, after the predetermined period of time T0 elapses, or when determination is made as timed, (i.e., at time t6), voltage variation length VLint can reach the level of threshold value a indicating that a CID has been operated. Thus, VLint>α and IBint<β, and accordingly, ECU 300 determines that the CID has been operated, and ECU 300 switches SMR 115 to a non-conduction state to protect electric power storage device 110

Thus, voltage variation length VLint and current variation length IBint can be used to appropriately determine whether a CID has been operated.

Figure 6:
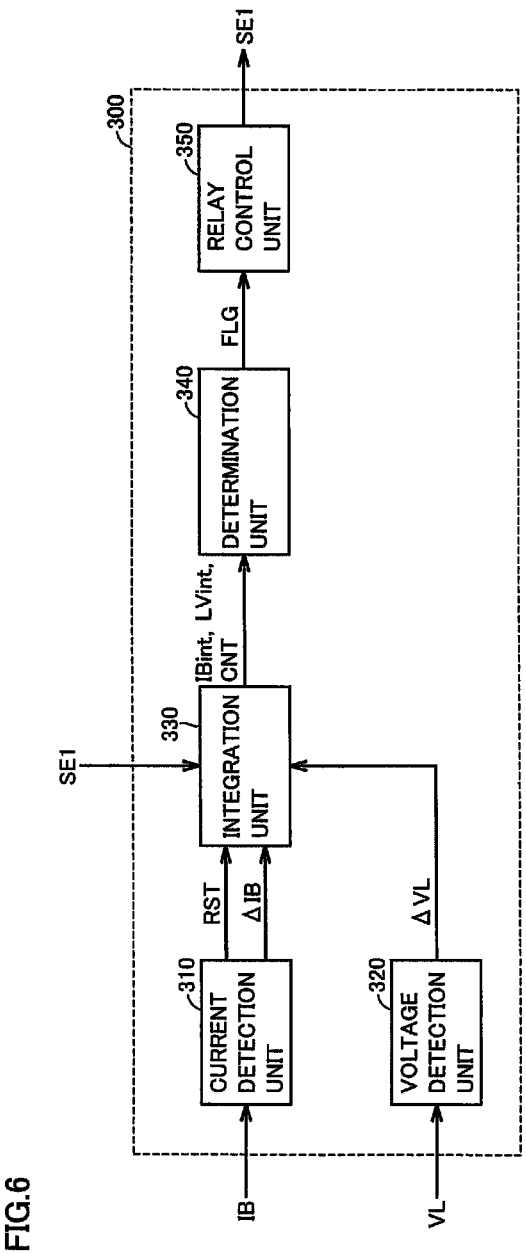
FIG. 6 is a functional block diagram for illustrating how an ECU exerts control in detecting whether the CID has been operated in the present embodiment.

FIG. 6 is a functional block diagram for illustrating how ECU 300 exerts control in detecting whether a CID has been operated in the present embodiment. The FIG. 6 functional block diagram shows functional blocks each implemented through a process performed by ECU 300 through hardware or software.

Referring to FIG. 1 and FIG. 6, ECU 300 includes a current detection unit 310, a voltage detection unit 320, an integration unit 330, a determination unit 340, and a relay control unit 350.

Current detection unit 310 receives from current sensor 112 current IB input to and output from electric power storage device 110. Current detection unit 310 generates a reset signal RST based on current IB for returning an integrated value in integration unit 330, which will be described hereinafter, to an initial value. Specifically, current detection unit 310 sets on reset signal RST to return the integrated value to the initial value when current IB attains an absolute value equal to or larger than a predetermined reference current.

Furthermore, current detection unit 310 calculates an amount ΔIB by which current IB has varied from a current value detected for the immediately previous sampling period. Then, current detection unit 310 outputs to integration unit 330 reset signal RST and amount ΔIB by which the current has varied.

Voltage detection unit 320 receives from voltage sensor 124 voltage VL applied to load device 180. Voltage detection unit 320 calculates an amount ΔVL by which voltage VL has varied from a voltage value detected for the immediately previous sampling period. Then, voltage detection unit 320 outputs to integration unit 330 amount ΔVL by which the voltage has varied, as calculated.

Integration unit 330 receives reset signal RST and amount ΔIB by which the current has varied from current detection unit 310, and amount ΔVL by which the voltage has varied from voltage detection unit 320. Furthermore, integration unit 330 receives a control signal SE1 for driving SMR 115.

When SMR electrically conducts by control signal SE1 and reset signal RST from current detection unit 310 is set off, integration unit 330 integrates amounts ΔVL and ΔIB by which voltage VL and current IB vary, respectively, for each sampling period, and calculates voltage variation length VLint and current variation length IBint. Furthermore, integration unit 330 also integrates a counter CNT indicating a time for which the amounts are integrated (i.e., a monitoring time).

Then, integration unit 330 outputs the calculated voltage variation length VLint, the calculated current variation length IBint, and counter CNT to determination unit 340.

Note that when reset signal RST from current detection unit 310 is set on, or when SMR 115 does not electrically conduct, integration unit 330 returns the above integrated values to initial values (for example, zero), respectively.

Determination unit 340 receives information on voltage variation length VLint, current variation length IBint, and counter CNT from integration unit 330. Determination unit 340 initially determines whether counter CNT represents a time having reached a predetermined reference time. Once the reference time has elapsed, whether any CID has been operated is determined from a value of voltage variation length VLint and that of current variation length IBint that are obtained when the reference time is reached. The resultant determination, or a determination flag FLG, is output to relay control unit 350. Determination flag FLG is set on for example if it is determined that a CID has been operated, and determination flag FLG is set off for example if it is determined that no CID has been operated.

Relay control unit 350 receives determination flag FLG from determination unit 340. If determination flag FLG is set on, i.e., if it is determined that a CID has been operated, relay control unit 350 sets such control signal SE1 that prevents SMR 115 from electrically conducting and thus protects devices such as electric power storage device 110.

FIG. 7 is a flowchart for specifically illustrating a CTD operation detection control process performed by ECU 300 in the present embodiment. The FIG. 7 flowchart is implemented as a process by calling a program that is previously stored in ECU 300 from a main routine, and performing the program periodically as predetermined. Alternatively, some step(s) can also be implemented as a process in dedicated hardware (or electronic circuitry).

Referring to FIG. 1 and FIG. 7, ECU 300 in step (S) 100 determines whether SMR 115 is connected and thus electrically conducts.

If not, (NO at S100), the control proceeds to S170 and ECU 300 returns counter CNT, voltage variation length VLint, and current variation length IBint in integration unit 330 of FIG. 6 to initial values or zero. Then, the control returns to the main routine.

If SMR 115 electrically conducts (YES at S100), the control proceeds to S110. ECU 300 in S110 determines whether current IB has an absolute value smaller than reference current Ith, i.e., a state of a small current.

If not (NO at S110), ECU 300 proceeds to S170 to return each integrated value to the initial value, and thereafter returns to the main routine.

If current IB has an absolute value smaller than reference current Ith (YES at S110), ECU 300 proceeds to S120 to perform a process to add counter CNT, voltage variation length VLint, and current variation length IBint. Then, ECU 300 in S130 determines whether counter CNT has reached a count value indicating that the monitoring time (or the reference time) has elapsed.

If not (NO at S130), the control returns to the main routine, and if the conditions of S100 and S110 are still established, the S120 integration processing is continued.

If counter CNT has reached the count value indicating the reference time (YES at S130), ECU 300 proceeds to S140 to determine whether voltage variation length VLint is equal to or larger than threshold value a and current variation length IBint is smaller than threshold value β.

If so (YES at S140), ECU 300 proceeds to S150 to determine that a CID of electric power storage device 110 has been operated. Then, ECU 300 in S160 opens SMR 115, i.e., prevents SMR 115 from electrically conducting.

If voltage variation length VLint is smaller than threshold value a or current variation length IBint is equal to or larger than threshold value β (NO at S140), ECU 300 determines that no CID is in operation, and ECU 300 proceeds to S170. Then, ECU 300 returns each integrated value to the initial value, and returns to the main routine.

Controlling in accordance with such a process as described above can prevent such an erroneous determination that a CID has been operated, when the variation of voltage VL occurs due to suddenly change of a traveling condition, such as in the case where a slip/grip or the like occurs.

Note that erroneous determination for a CID may be prevented by setting threshold value Ith for current IB indicated in FIG. 7 at S110 to have a small value, rather than using voltage and current variation lengths for determining whether the CID has been operated, as described in the present embodiment. In that case, however, the determination per se of whether a CID has been operated is made difficult to perform, and a system's detection ability may be impaired on the contrary. Using voltage and current variation lengths for determining whether a CID has been operated, as done in the present embodiment, can prevent the system from having an impaired detection ability and also allows a CID to be detected with precision.

It should be understood that the embodiment disclosed herein is illustrative and non-restrictive in any respect. The scope of the present invention is defined by the terms of the claims, rather than the description above, and is intended to include any modifications within the scope and meaning equivalent to the terms of the claims.

Reference Signs List

100: vehicle; 105: electric power supply system; 110: electric power storage device; 111, 124, 125: voltage sensor; 112: current sensor; 115: SMR; 120: PCU; 121: converter; 122, 123: inverter; 130, 135: motor generator; 140: motive power transmission gear; 150: driving wheel; 160: engine; 170: accessory device; 180: load device; 300: ECU; 310: current detection unit; 320: voltage detection unit; 330: integration unit; 340: determination unit; 350: relay control unit; C1, C2: capacitor; CID: current interrupt device; CL1-CLn: battery cell; NL1: ground line; PL1, PL2: electric power line.

The invention claimed is:

1. An electric power supply system for supplying a load device with driving electric power, comprising:
an electric power storage device electrically connected to said load device; and
a controller for controlling said electric power storage device,
said electric power storage device including an interrupt device configured to interrupt an electrical conduction path of said electric power storage device in response to said electric power storage device having an internal pressure exceeding a rated value,
said controller calculating a voltage variation length corresponding to an integral of an amount by which a voltage applied to said load device varies in magnitude and a current variation length corresponding to an integral of an amount by which a current input to and output from said electric power storage device varies in magnitude for each sampling period for a predetermined period of time, and determining whether or not said interrupt device has been operated, based on said voltage variation length and said current variation length.

2. The electric power supply system according to claim 1, wherein said controller determines that said interrupt device has been operated when said current has an absolute value smaller than a predetermined reference value and said voltage variation length is larger than a first threshold value and said current variation length is smaller than a second threshold value.

3. The electric power supply system according to claim 2, wherein:
a switching device is provided on a route connecting said electric power storage device and said load device for switching electrical conduction and non conduction states between said electric power storage device and said load device; and
when said controller determines that said interrupt device has been operated, said controller switches said switching device to the electrical non conduction state.

4. The electric power supply system according to claim 2, wherein if said current has an absolute value larger than said reference value, said controller sets said voltage variation length and said current variation length to have initial values, respectively.

5. The electric power supply system according to claim 2, wherein:
a switching device is provided on a route connecting said electric power storage device and said load device for switching electrical conduction and non conduction states between said electric power storage device and said load device; and
when said switching device is set to the electrical conduction state, said controller determines whether said interrupt device has been operated, and when said switching device is set to the electrical non conduction state, said controller responsively sets said voltage variation length and said current variation length to have initial values, respectively.

6. The electric power supply system according to claim 1, wherein a capacitor connected in parallel with said electric power storage device is provided between input terminals of said load device.

7. A vehicle comprising:
an electric power storage device;
a load device including a drive device configured to use electric power received from said electric power storage device to generate force to drive the vehicle; and
a controller for controlling said electric power storage device,
said electric power storage device including an interrupt device configured to interrupt an electrical conduction path of said electric power storage device in response to said electric power storage device having an internal pressure exceeding a rated value, said controller calculating a voltage variation length corresponding to an integral of an amount by which a voltage applied to said load device varies in magnitude and a current variation length corresponding to an integral of an amount by which a current input to and output from said electric power storage device varies in magnitude for each sampling period for a predetermined period of time, and determining whether or not said interrupt device has been operated, based on said voltage variation length and said current variation length.

8. A method for controlling an electric power storage device for supplying a load device with driving electric power, said electric power storage device including an interrupt device configured to interrupt an electrical conduction path of said electric power storage device in response to said electric power storage device having an internal pressure exceeding a rated value, the method comprising the steps of:

detecting a voltage applied to said load device;

detecting a current input to and output from said electric power storage device; and calculating a voltage variation length corresponding to an integral of an amount by which said voltage varies in magnitude and a current variation length corresponding to an integral of an amount by which said current varies in magnitude for each sampling period for a predetermined period of time, and determining whether or not said interrupt device has been operated, based on said voltage variation length and said current variation length.

* * * * *

UNITED STATES PATENT AND TRADEMARK OFFICE
CERTIFICATE OF CORRECTION

PATENT NO. : 8,922,170 B2  Page 1 of 1
APPLICATION NO. : 13/994329
DATED : December 30, 2014
INVENTOR(S) : Noritake Mitsutani et al.

It is certified that error appears in the above-identified patent and that said Letters Patent is hereby corrected as shown below:

In the Specification

At column 7, line 21, change "amount AIB(i)" to -- amount $\Delta$IB(i) --.

At column 7, line 42, change "a CTD has been" to -- a CID has been --.

At column 7, line 54, change "a CTD operated" to -- a CID operated --.

At column 8, line 13, change "no CTD is operated" to -- no CID is operated --.

At column 8, line 26, change "TB, is relatively" to -- "IB, is relatively --.

At column 8, line 51, change "CTD is operated" to -- CID is operated --.

At column 9, line 61, change "AIB by which" to -- $\Delta$IB by which --.

At column 10, line 45, change "a CTD operation" to -- a CID operation --.

Signed and Sealed this
Twenty-ninth Day of September, 2015

Michelle K. Lee
*Director of the United States Patent and Trademark Office*